US005568038A

United States Patent [19]
Tatsumi

[11] Patent Number: 5,568,038
[45] Date of Patent: Oct. 22, 1996

[54] PORTABLE ELECTRIC EQUIPMENT AND RECHARGEABLE BUILT-IN BATTERIES

[75] Inventor: Satoshi Tatsumi, Tokyo, Japan

[73] Assignee: NEC Corporation, Japan

[21] Appl. No.: 344,347

[22] Filed: Nov. 22, 1994

[30] Foreign Application Priority Data

Nov. 26, 1993 [JP] Japan ................................ 5-296490

[51] Int. Cl.$^6$ ............................ H01M 10/46; H02J 3/32; H02J 7/34
[52] U.S. Cl. ................................. 320/14; 320/56; 307/48
[58] Field of Search .................................... 320/14, 9, 10, 320/19, 21, 39, 56; 307/44, 48, 66, 19; 455/343

[56]   References Cited
U.S. PATENT DOCUMENTS

| | | | |
|---|---|---|---|
| 3,987,352 | 10/1976 | Hirota | 320/19 X |
| 4,287,465 | 9/1981 | Godard et al. | 320/56 |
| 4,458,111 | 7/1984 | Sugihara . | |
| 5,149,985 | 9/1992 | Fujiwara | 307/48 X |
| 5,343,136 | 8/1994 | Yamaguchi et al. | 320/56 X |

FOREIGN PATENT DOCUMENTS 437129  7/1991  European Pat. Off. .
3-173326  12/1989  Japan .
2249677  5/1992  United Kingdom .

OTHER PUBLICATIONS

J. R. Gyorki, *Hybrid Battery Systems Take Charge*, Machine Design, Nov. 9, 1989, pp. 123–127.
*Patent Abstracts of Japan*, vol. 17, No. 450 (E–1416) (6079) 18 Aug. 1993 JP–A–095 634 Apr. 16, 1993.

Primary Examiner—Edward H. Tso
Attorney, Agent, or Firm—Ostrolenk, Faber, Gerb & Soffen, LLP

[57]   ABSTRACT

A battery use system for a battery-driven portable electronic equipment includes a first battery chargeable and serving as a direct power supply source, a second battery parallelly connected to the first battery through a switch, a voltage detection circuit for detecting an output voltage from the first battery, a consumption current detection circuit for detecting the state of the consumption current of the portable electronic equipment, and a switch control circuit for controlling open and close of the switch in accordance with an output from the voltage detection circuit and an output from the consumption current detection circuit. The switch is closed to charge the first battery by the second battery when the output voltage from the first battery becomes smaller than a predetermined value, and at the same time, the consumption current is sufficiently small.

3 Claims, 5 Drawing Sheets

PORTABLE ELECTRIC EQUIPMENT AND RECHARGEABLE BUILT-IN BATTERIES

BACKGROUND OF THE INVENTION

1. Field of the Invention

The present invention relates to a battery use system for a portable electronic equipment and, more particularly, to a battery use system capable of prolonging a use time of a battery-driven portable electronic equipment.

2. Description of the Related Art

Conventionally, as a power supply battery used in a portable electronic equipment, a nickel-cadmium battery having a in high safety and a low internal resistance, a nickel-hydrogen battery having a larger capacity, or the like is often used. However, to use the electronic equipment for a longer time, the capacity of the power supply need to be increased. For this purpose, a battery back-up system by a primary battery as in the first prior art (to be described later), multi-stage series connection as in the second prior art, or a lithium-ion battery having a larger capacity as in the third prior art is used.

More specifically, in the first prior art, as shown in FIG. 1, a secondary battery 100 is parallelly connected between a power supply input terminal 7 and a ground terminal 8 of an electronic equipment 110 through a diode 28. A primary battery 31 is also parallelly connected between the terminals 7 and 8 through a charge preventing diode 29 and a resistor 30. Normally, the secondary battery 100 applies a power supply voltage to the electronic equipment 110 while no power is supplied from the primary battery 31 because of the function of the resistor 30. Additionally, because of the function of the charge preventing diode 29, the primary battery 31 is not charged by the secondary battery 100. When the power supply from the secondary battery 100 is stopped, the power supply for the electronic equipment 110 is backed up by the primary battery 31.

In the second prior art, as shown in FIG. 2, a number of power supply batteries are connected in series with each other to constitute a secondary battery 32. This secondary battery 32 is set to a desired voltage through a regulator 33 and parallelly connected to an electronic equipment 110, thereby increasing the capacity of the power supply.

In the third prior art, as shown in FIG. 3, a lithium-ion battery 13 whose large capacity is receiving a great deal of attention today is parallelly connected to an electronic equipment 110.

Note that, in the present invention, an unchargeable battery which is discarded after consumption is defined as a primary battery, and a chargeable battery is defined as a secondary battery.

The above prior arts have the following problems.

That is, in the first prior art, since the primary battery 31 is used, this battery is wastefully discarded after discharge. In addition, the primary battery 31 may be charged and explode due to leakage of the charge preventing diode 29.

In the second prior art, because of the simple multi-stage series connection of batteries, the number of batteries is large resulting in an increase in weight and volume of the portable electronic equipment.

In the third prior art, the lithium-ion battery has a large capacity. However, since the battery has a large internal resistance, a large voltage drop is generated upon outputting a large current. Especially in an electronic equipment for performing an intermittent operation, the operation becomes unstable, and noise is generated.

SUMMARY OF THE INVENTION

The present invention has been made to solve the above problems in the prior arts, and has as its object to provide a battery use system capable of prolonging the use time of a battery-driven portable electronic equipment and ensuring safety.

In order to achieve the above object, according to the first aspect of the present invention, there is provided a battery use system for a battery-driven portable electronic equipment, comprising a first battery chargeable and serving as a direct power supply source, a second battery parallelly connected to the first battery through a switch, voltage detecting means for detecting an output voltage from the first battery, consumption current detecting means for detecting a state of a consumption current of the portable electronic equipment, and switch control means for controlling open and close of the switch in accordance with an output from the voltage detecting means and an output from the consumption current detecting means, wherein the switch is closed to charge the first battery by the second battery when the output voltage from the first battery becomes smaller than a predetermined value, and at the same time, the consumption current is sufficiently small.

In addition, according to the second aspect of the present invention, there is provided a system wherein the portable electronic equipment described in the first aspect is a cellular radio telephone set or a mobile radio telephone set of a portable type, the consumption current detecting means is constituted by a circuit for detecting a busy/non-busy state of the telephone, and the switch is closed to charge the first battery by the second battery when the output voltage from the first battery becomes smaller than the predetermined value in a non-busy state of the telephone.

The first and second batteries in the first and second aspects are a nickel-cadmium storage battery and a lithium-ion storage battery, respectively.

According to the present invention having the above aspects, the first secondary battery serving as the direct current supply source, the second secondary battery parallelly connected to the first secondary battery through the switch, the circuit for detecting the output voltage from the first secondary battery, and the circuit for detecting the state of the consumption current of the electronic equipment are arranged. Therefore, the battery for back up can be repeatedly used many times.

In addition, the second secondary battery is normally in an OFF (open) state. The second secondary battery is connected through the switch which is set in an ON (close) state only when the potential of the first secondary battery is lower than that of the second secondary battery. For this reason, the second secondary battery is prevented from being erroneously charged by the first secondary battery, realizing a safe circuit design.

Furthermore, particularly when a nickel-cadmium storage battery is used as the first secondary battery, and a lithium-ion storage battery is used as the second secondary battery, both the large capacity properties of the lithium-ion storage battery and the low internal resistance of the nickel-cadmium storage battery can be utilized at a maximum degree. The voltage drop upon outputting a large current can be reduced, a stable operation can be obtained in an intermittent operation, and noise can be prevented.

3

The above and other advantages, features and additional objects of the present invention will become manifest to those versed in the art upon making reference to the following detailed description and accompanying drawings in which preferred embodiments incorporating the principle of the present invention are shown by way of illustrative example.

DETAILED DESCRIPTION OF THE PREFERRED EMBODIMENTS

Figure 1:
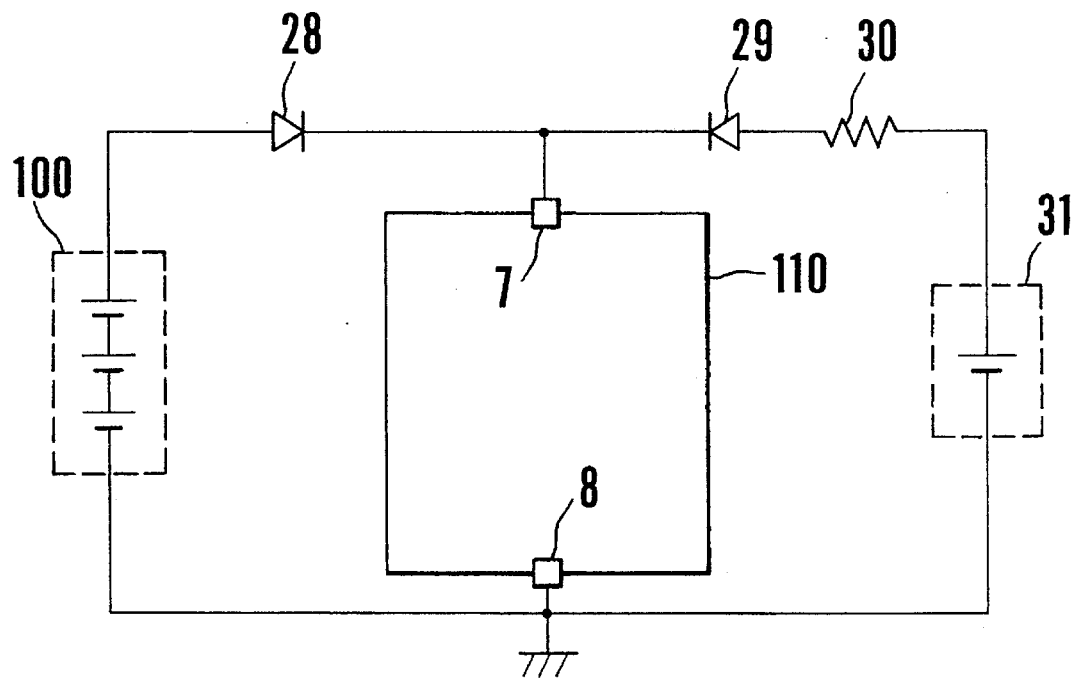
FIGS. 1 to 3 are circuit diagrams showing the first, second, and third prior arts, respectively.
Figure 2:
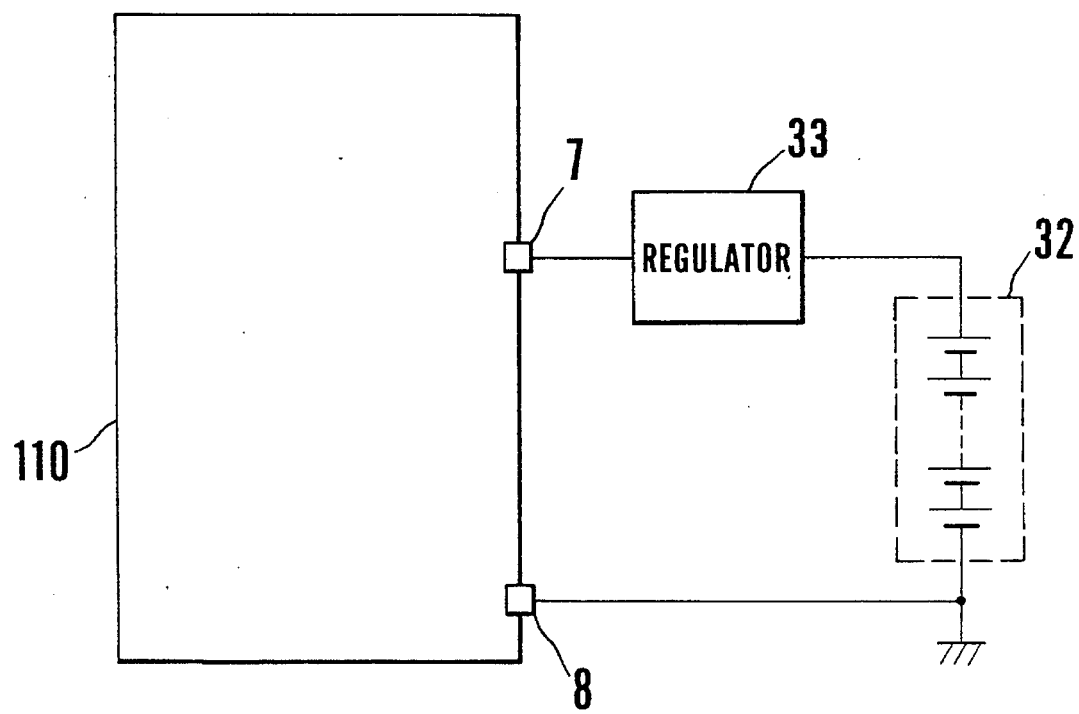
Figure 3:
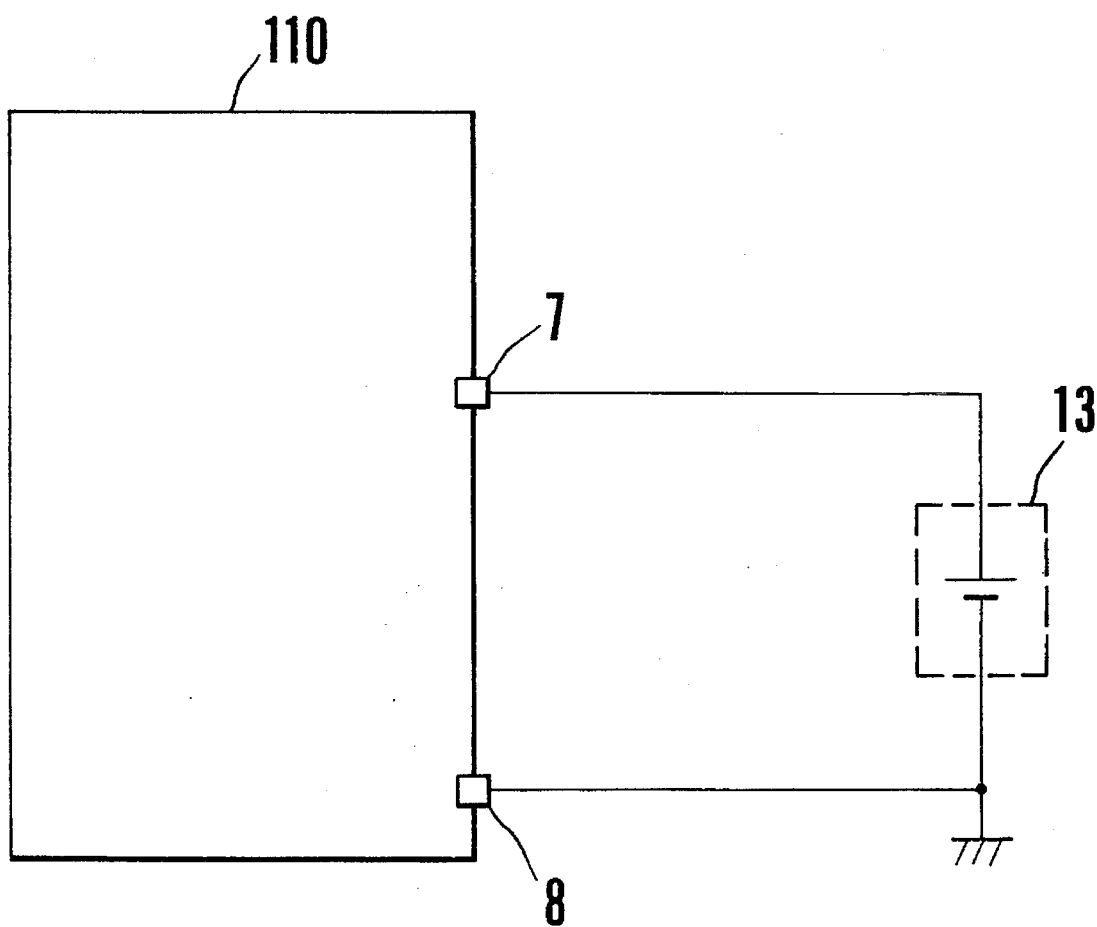
Figure 4:
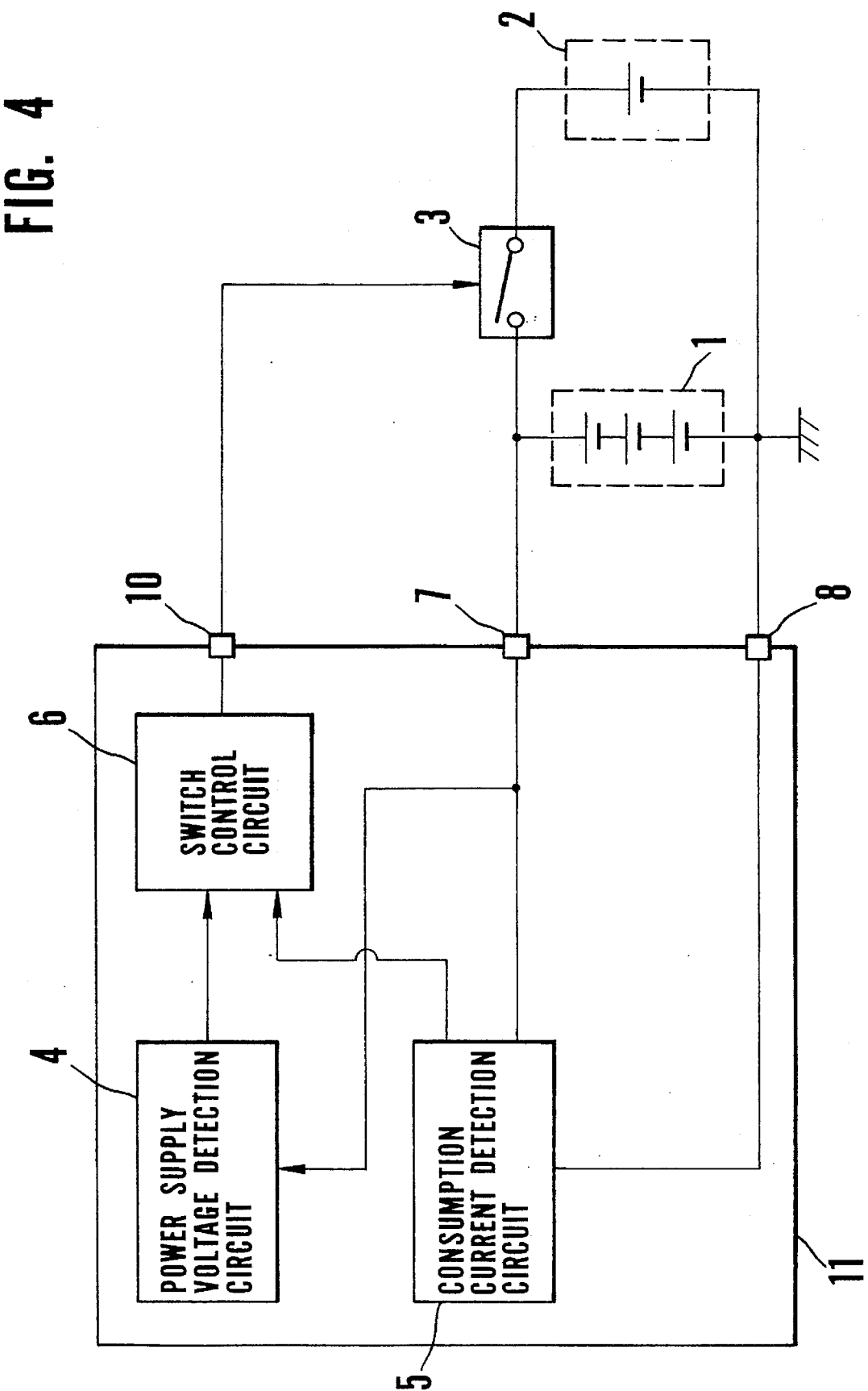
FIG. 4 is a block diagram for explaining the principle of the present invention.
Figure 5:
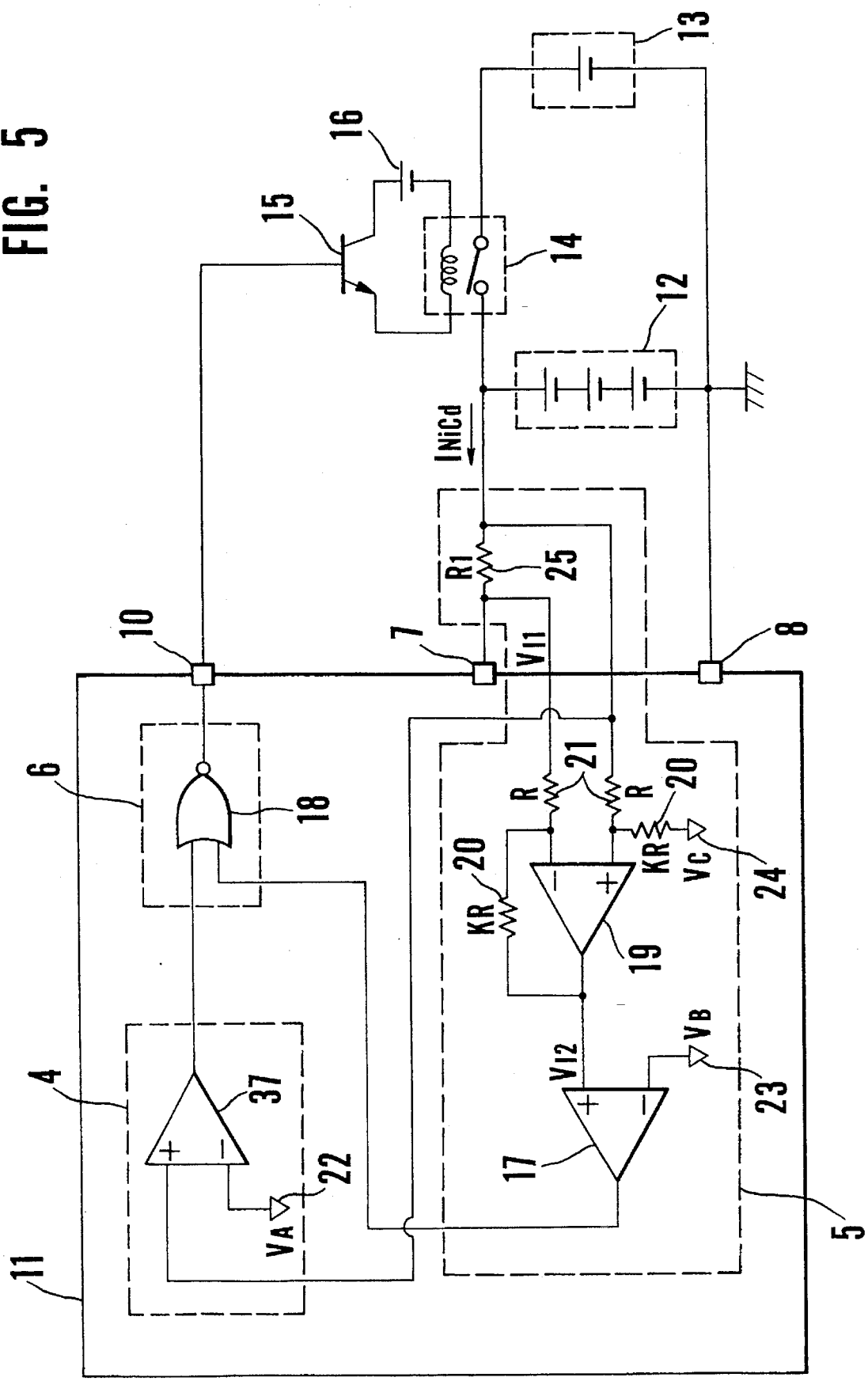
FIGS. 5 and 6 are circuit diagrams showing the first and second embodiments of the present invention, respectively.
Figure 6:
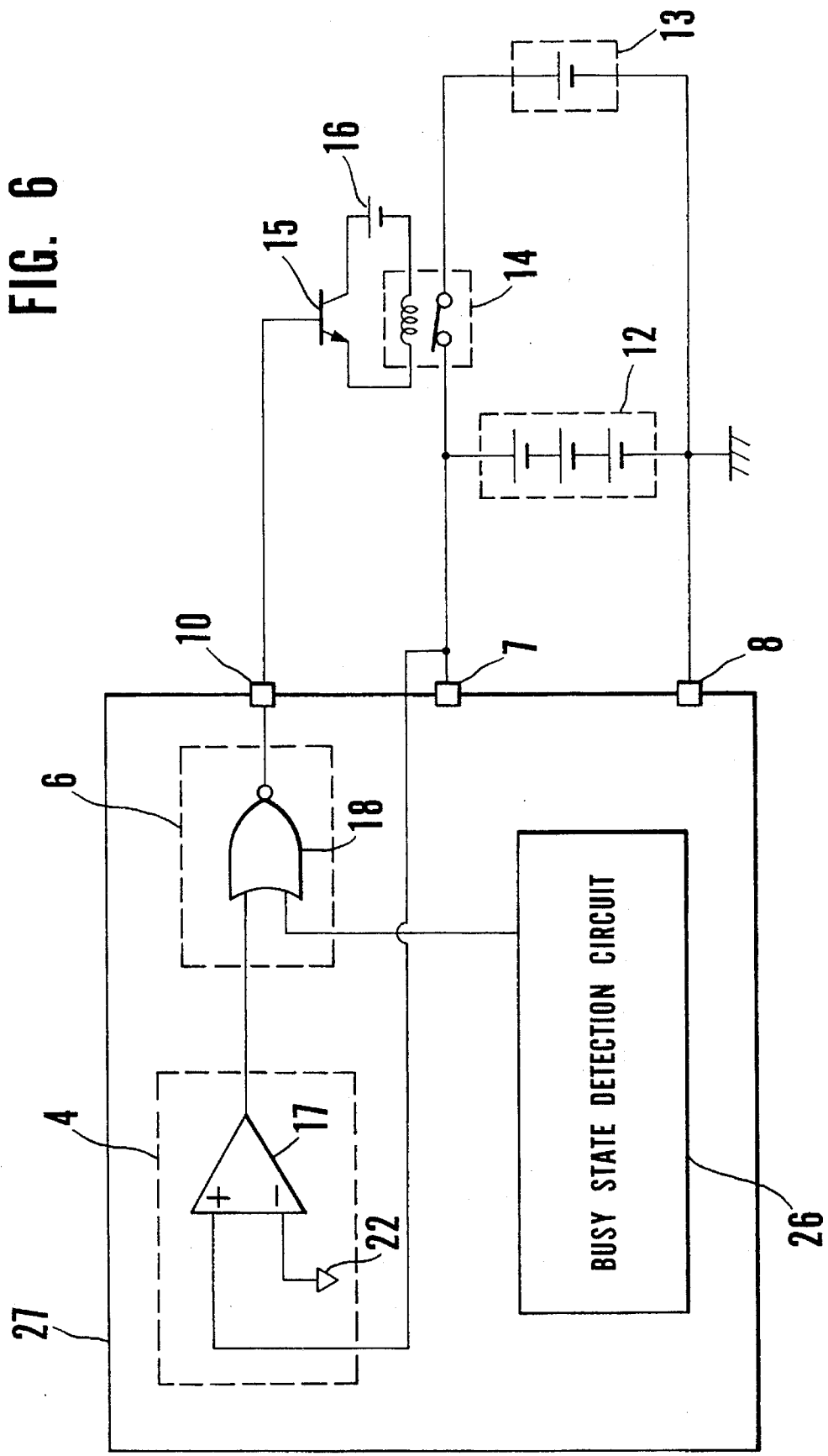

The present invention will be described below in detail in relation to the accompanying drawings (FIGS. 4 to 6).

First of all, a description will be made with reference to FIG. 4 showing a block diagram for explaining the principle of the present invention. As shown in FIG. 4, a battery-driven portable electronic equipment has a first secondary battery 1 serving as a direct power supply source for an electronic equipment portion 11, and a second secondary battery 2 parallelly connected to the first secondary battery 1 through a switch 3. The electronic equipment also has a consumption current detection circuit 5 for detecting the state of the consumption current of the electronic equipment portion 11, a power supply voltage detection circuit 4 for detecting an output voltage from the first secondary battery 1, and a switch control circuit 6 for turning on the switch 3 to charge the first secondary battery 1 by the second secondary battery 2 when the consumption current of the electronic equipment portion 11 is small and the power supply voltage becomes smaller than a predetermined value. This electronic equipment has no primary battery.

FIG. 5 is a circuit diagram showing the first embodiment, in which, in the battery-driven electronic equipment, only a portion related to the present invention is shown. A nickel-cadmium storage battery 12 and a lithium-ion storage battery 13 are parallelly connected with each other between a power supply input terminal 7 and a ground terminal 8 of the electronic equipment portion 11 through a relay switch 14. Normally, the relay switch 14 is in an open state not to connect the lithium-ion storage battery 13. A power is supplied from only the nickel-cadmium storage battery 12.

However, when the capacity of the nickel-cadmium storage battery 12 is reduced to cause a decrease in output voltage, this decrease is detected by the power supply voltage detection circuit 4. The relay switch 14 is closed to charge the nickel-cadmium storage battery 12 by the lithium-ion storage battery 13. However, this charge operation need to be performed when the consumption current of the electronic equipment portion 11 is sufficiently small, and at the same time, a voltage drop caused due to the internal resistance of the lithium-ion storage battery 13 can be ignored. For this reason, the consumption current detection circuit 5 for directly detecting the consumption current is arranged.

This consumption current detection circuit 5 detects the output current from the nickel-cadmium storage battery 12 and outputs a signal of level "0" when the output current value is smaller than a predetermined current value. The output current from the nickel-cadmium storage battery 12 is read as a voltage value by using a resistor 25 (a minimum resistance is selected so that the voltage drop thereacross is negligible) series-connected between the nickel-cadmium storage battery 12 and the power supply input terminal 7. The read voltage value is compared with a predetermined reference voltage value $V_B$ 23 by a comparator 17.

For example, when the output current from the nickel-cadmium storage battery 12 is defined as $I_{Nicd}$, and the resistance of the resistor 25 for current measurement is defined as $R_1$, a voltage drop $V_{f1}$ across the two ends of the resistor 25 is represented by the following equation (1):

$$V_{f1} = I_{Nicd} \cdot R_1 \quad (1)$$

This voltage drop $V_{f1}$ is converted into a voltage appropriate for the comparator of next stage by a differential single conversion circuit constituted by resistors 21 and 20 and an operational amplifier 19. When an output from the differential single conversion circuit, i.e., an input voltage to the comparator 17 is defined as $V_{f2}$, the following equation is obtained:

$$V_{f2} = K \cdot V_{f1} + V_c = K \cdot I_{Nicd} \cdot R_1 + V_c \quad (2)$$

This voltage $V_{f2}$ is compared with the reference voltage $V_B$ by the comparator 17.

In the above equation (2), K represents a coefficient of the resistor 20 with respect to the resistor 21, and $V_c$ represents the output voltage from a reference voltage 24 to the operational amplifier 19.

The power supply voltage detection circuit 4 is constituted by a comparator 37. The power supply voltage detection circuit 4 outputs a signal of level "0" when the output voltage from the nickel-cadmium storage battery 12 is smaller than a reference voltage $V_A$ 22, or outputs a signal of level "1" when the output voltage is larger than the reference voltage $V_A$.

The switch control circuit 6 is constituted by a NOR logic element 18 and receives an output from the consumption current detection circuit 5 and an output from the power supply voltage detection circuit 4. Only when both inputs are signals of level "0", the switch control circuit 6 outputs a signal of level "1" to turn on a transistor 15, thereby closing the relay switch 14.

As described above, open/close of the relay switch 14 is controlled by the power supply voltage detection circuit 4, the consumption current detection circuit 5, the switch control circuit 6, the transistor 15, and a power supply 16.

FIG. 6 is a circuit diagram showing the second embodiment of the present invention. In this embodiment, a portable telephone is exemplified as a battery-driven electronic equipment. This embodiment is different from the first embodiment in the following point. That is, the busy/non-busy state of a portable telephone portion 27 is detected in place of the direct detection of the consumption current of a battery. In a non-busy state, a first secondary battery (nickel-cadmium storage battery 12) is charged by a second secondary battery (lithium-ion storage battery 13). A busy state detection circuit 26 outputs a signal of level "1" during a busy state of the portable telephone portion 27 and outputs a signal of level "0" in a non-busy state. The remaining operation is the same as that in the first embodiment. The busy state detection circuit 26 eventually performs the same function as detection of the consumption current of the portable telephone portion 27.

What is claimed is:

1. A battery system for battery-driven portable electronic equipment, comprising a first battery chargeable and serving as a direct power supply source, a second battery connected parallel to said first battery through a switch, a voltage detection circuit detecting an output voltage from said first battery, consumption current detection circuit detecting a state of a consumption current of said portable electronic equipment, and switch control circuit controlling opening and closing of said switch in accordance with an output from said voltage detection circuit and an output from said consumption current detection circuit, wherein said switch is closed to charge said first battery by said second battery when the output voltage from said first battery becomes smaller than a predetermined value and the consumption current is sufficiently small, and said portable electronic equipment is a cellular radio telephone set or a mobile radio telephone set of a portable type, said consumption current detection circuit is a circuit for detecting a busy/non-busy state of said telephone, and said switch is closed to charge said first battery by said second battery when the output voltage from said battery becomes smaller than the predetermined value in a non-busy state of said telephone.

2. A battery system for battery-driven portable electronic equipment, comprising a first battery chargeable and serving as a direct power supply source, a second battery connected parallel to said first battery through a switch, a voltage detection circuit detecting an output voltage from said first battery, consumption current detection circuit for detecting a state of a consumption current of said portable electronic equipment, and switch control circuit controlling opening and closing of said switch in accordance with an output from said voltage detection circuit and an output from said consumption current detection circuit, wherein said switch is closed to charge said first battery by said second battery when the output voltage from said first battery becomes smaller than a predetermined value and the consumption current is sufficiently small, said portable electronic equipment is a cellular radio telephone set or a mobile radio telephone set of a portable type, said consumption current detection circuit is a circuit for detecting a busy/non-busy state of said telephone, and said switch is closed to charge said first battery by said second battery when the output voltage from said battery becomes smaller than the predetermined value in a non-busy state of said telephone, and said first battery is a nickel-cadmium storage battery, and said second battery is a lithium-ion storage battery having a charging ability.

3. A system according to claim 1, wherein said first battery is a nickel-cadmium storage battery, and said second battery is a lithium-ion storage battery having a charging ability.

* * * * *